United States Patent [19]
Tsukagoshi

[11] Patent Number: 6,119,744
[45] Date of Patent: Sep. 19, 2000

[54] HEAVY DUTY PNEUMATIC TIRES INCLUDING PROTRUSIONS

[75] Inventor: Tetsuhito Tsukagoshi, Iruma, Japan

[73] Assignee: Bridgestone Corporation, Tokyo, Japan

[21] Appl. No.: 09/166,839

[22] Filed: Oct. 6, 1998

[30] Foreign Application Priority Data

Oct. 6, 1997 [JP] Japan .................................. 9-272938

[51] Int. Cl.⁷ .......................... B60C 11/13; B60C 101/00
[52] U.S. Cl. ................... 152/209.19; 152/209.21
[58] Field of Search ........................ 152/209.18, 209.19, 152/209.21

[56] References Cited

U.S. PATENT DOCUMENTS

| | | | |
|---|---|---|---|
| 2,121,871 | 6/1938 | Havens | 152/209.21 |
| 2,265,543 | 12/1941 | Overman | 152/209.21 |
| 2,661,041 | 12/1953 | Walsh | 152/209.21 |
| 2,850,066 | 9/1958 | Nellen | 152/209.21 |
| 3,095,024 | 6/1963 | Robertson | 152/209.21 |
| 3,893,498 | 7/1975 | Wayne | 152/209.21 |
| 4,217,942 | 8/1980 | Takigawa et al. | 152/209.21 |
| 4,230,512 | 10/1980 | Makino et al. | 152/209.21 |
| 4,332,286 | 6/1982 | Takigawa et al. | 152/209.21 |
| 5,147,478 | 9/1992 | Nock et al. | 152/209.21 |

FOREIGN PATENT DOCUMENTS

| | | |
|---|---|---|
| 0 391 600 A2 | 10/1990 | European Pat. Off. . |
| 2 715 891 | 8/1995 | France . |
| 60-121103 | 6/1985 | Japan . |
| 62-4610 | 1/1987 | Japan . |
| 3-276802 | 12/1991 | Japan ................................ 152/209.21 |
| 4-221207 | 8/1992 | Japan ................................ 152/209.21 |
| 5-169920 | 7/1993 | Japan ................................ 152/209.21 |
| 8-150812 | 6/1996 | Japan ................................ 152/209.21 |
| 8-318708 | 12/1996 | Japan ................................ 152/209.21 |

OTHER PUBLICATIONS

Database WPI, Section Ch, Week 96333, Derwent Publications Ltd., London, GB; Class A95, AN 96–328944, XP002090196 & JP 08 150812 A (Bridgestone Corp) Jun. 11, 1996.

*Primary Examiner*—Steven D. Maki
*Attorney, Agent, or Firm*—Sughrue, Mion, Zinn, Macpeak & Seas, PLLC

[57] ABSTRACT

A heavy duty pneumatic tire comprises a tread provided with plural circumferential grooves, land portions defined by these circumferential grooves, and a groove fence portion formed in the circumferential groove so as to extend in a direction blocking the circumferential groove, in which the groove fence portion comprises at least two protrusions extending from a groove wall and/or groove bottom of the circumferential groove, and has given spaces between the protrusions in widthwise and circumferential directions of the tire.

8 Claims, 3 Drawing Sheets

FIG_1a
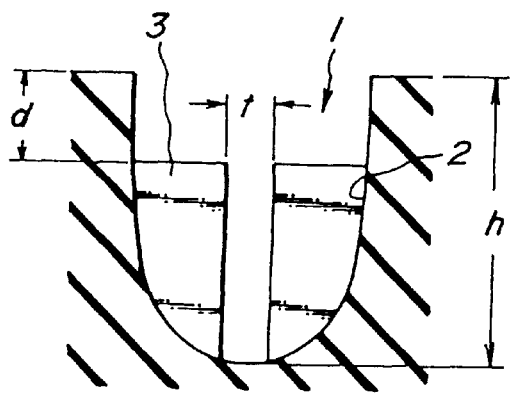
FIG_1b
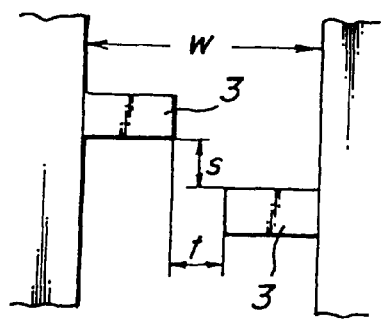
FIG_2a
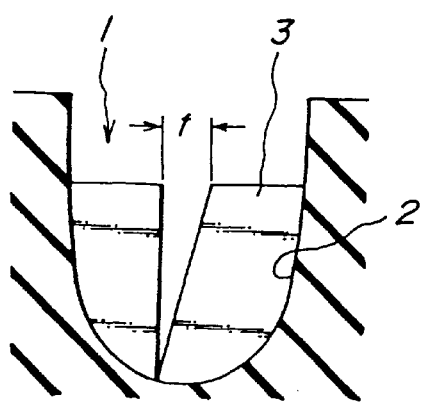
FIG_2b
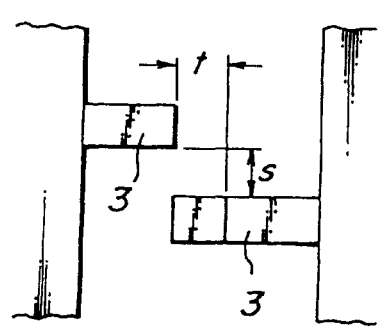
FIG_3a
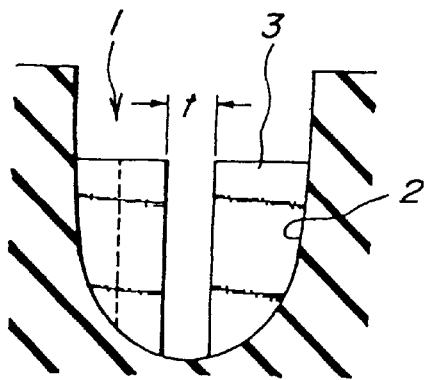
FIG_3b
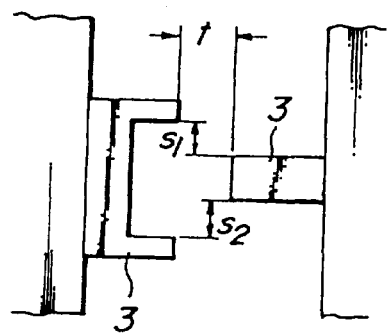

FIG._4a
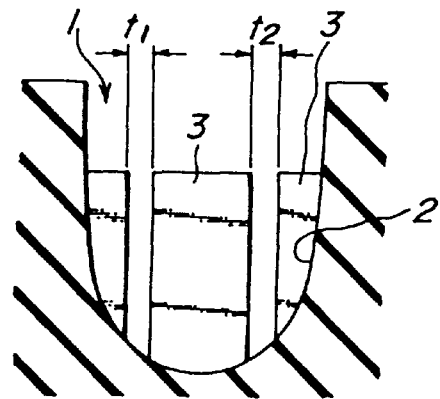
FIG._4b
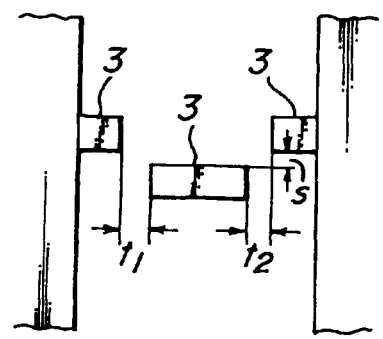
FIG._5a
*Comparative*
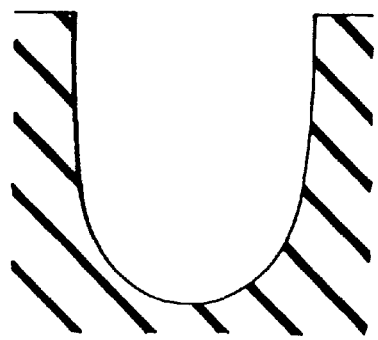
FIG._5b
*Comparative*
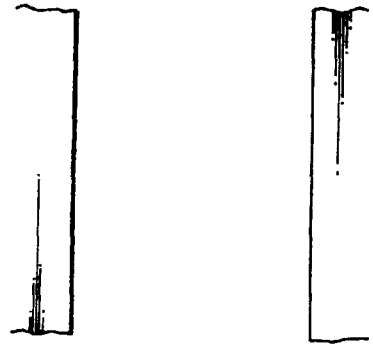
FIG._6a
*PRIOR ART*
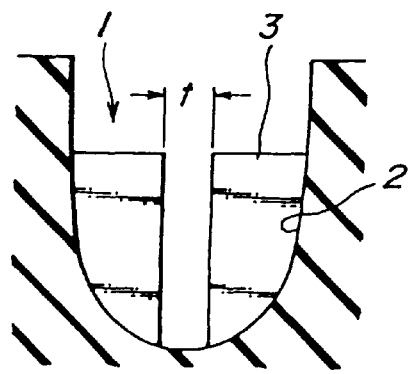
FIG._6b
*PRIOR ART*
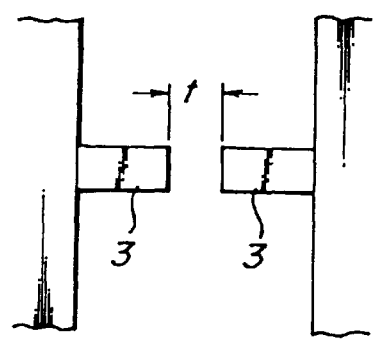

Comparative

Comparative

HEAVY DUTY PNEUMATIC TIRES INCLUDING PROTRUSIONS

BACKGROUND OF THE INVENTION

1. Filed of the Invention

This invention relates to a heavy duty pneumatic tire capable of reducing noise during running over a long period of time.

2. Description of Related Art

Recently, noise is recognized as a pollution problem from operation of an automobile. The noise generated during the running of the tire is a sound mainly based on air discharged from grooves formed in a tread between a tire tread and a road surface. The tire tread is comprised by endlessly and circumferentially arranging tread-constituting elements such as plural circumferential grooves, land portions defined by these grooves such as ribs, blocks and the like, and sipes formed in these land portions and so on.

Since air existing in the groove between the ribs or the blocks and in the sipe vibrates at a ground contact region of the tread with the rotation of the tire during the running of the tire, a pitch of sound or frequency is determined by the ground contacting number of the tread-constituting element per 1 second, which comes to person's ears as a certain sound level. Therefore, it is usually attempted to disperse a particular frequency into unobtrusive sound by applying pitch variation technique based on frequency modulation theory using different element lengths or different pitches to the tread-constituting element.

On the other hand, high speed running is increasing with the remarkable servicing of express way networks. In this case, wide-width and straight circumferential grooves are mainly used as a groove defining the land portion of the tread from a viewpoint of consideration on wet-skid resistance. However, such a circumferential groove creates columnar resonance therein, which results in a new noise problem. That is, the width of the circumferential groove in the ground contact region of the tread is narrowed at a stepping-in side and returned to an original width at a kicking-out side during the running of the tire under loading. Hence air existing in the circumferential groove at the ground contact region becomes dense at the stepping-in side and coarse at the kicking-out side to always generate an acoustic resonance sound as a stationary wave in the ground contact region, which brings about the occurrence of noise.

In order to prevent the occurrence of noise through columnar resonance, it has attempted in a heavy duty pneumatic tire for truck and bus that flexible groove fences, each formed by extending a part of a tread rubber from a groove wall or a groove bottom in a direction of blocking an air flow, are arranged in the circumferential groove at given intervals in the circumferential direction of the tread. As shown in FIGS. 6a and 6b, the conventional groove fences are double door type rubber fences 3 formed by extending a part of a land portion from opposed walls 2 of a circumferential groove 1 so as to leave a space of about 1 mm in a widthwise center of the circumferential groove. In general, the conventional groove fences block the columnar resonance by closing the door fences during the running under loading.

The conventional groove fences shown in FIGS. 6a and 6b have an effect of reducing the above columnar resonance, but cause another problem in that the door fences 3 contact with each other when the width of the circumferential groove 1 is reduced in the ground contact region under loading. Hence crack 4 is created in the vicinity of a boundary between the door fence 3 and the groove wall 2 as shown in FIG. 9 and finally the door fence 3 comes off of the groove wall 2 with the growth of the crack.

SUMMARY OF THE INVENTION

It is, therefore, an object of the invention to provide a heavy duty pneumatic tire reducing columnar resonance as a noise problem by groove fences and causing no crack in the groove fence during the running of the tire.

The inventor has made various studies in order to solve the above problem and found that when groove fences are arranged in the circumferential groove under a particular condition that these groove fences do not contact with each other under loading, the occurrence of cracks and damage of groove fence can be prevented without losing the effect of reducing the columnar resonance by blocking the circumferential groove and as a result the invention has been accomplished.

According to the invention, there is the provision of a heavy duty pneumatic tire comprising a tread provided with plural circumferential grooves extending in a circumferential direction of the tire, land portions defined by these circumferential grooves, and a groove fence portion formed in the circumferential groove so as to extend in a direction blocking the circumferential groove, in which the groove fence portion comprises at least two protrusions extending from a groove wall and/or groove bottom of the circumferential groove, and a space between the protrusions under a normal internal pressure in a widthwise direction of the tire is 0.5–2.0 mm, and a space between the protrusions under a load in the circumferential direction is 0.4–3.0 mm so as not to contact these protrusions with each other.

The term "normal internal pressure" used herein means a standard internal pressure defined by standards of the following standardization system, for example, "air pressure corresponding to maximum load capacity (maximum air pressure)" in JATMA YEAR BOOK.

The term "a load" used herein means a standard load defined by standards of the following standardization system, for example, a maximum load capacity (maximum load) in JATMA YEAR BOOK.

In addition, standards are defined by an existing standardization system in a country using tires or manufacturing tires, and are, for example, YEAR BOOK of TRA (THE TIRE AND RIM ASSOCIATION) in U.S.A., STANDARDS MILL OF ETRTO (The European Tyre and Rim Technical Organization) in Europe, and JATMA YEAR BOOK of The Japan Automobile Tire Manufacturers Association, Inc. in Japan.

In a preferable embodiment of the invention, the groove fence portions are disposed in each of the circumferential grooves at such an interval in the circumferential direction that only one of the groove fence portions is always and substantially included in the circumferential groove at a ground contact region defined in the running of the tire and the groove fence portions are arranged at a given pitch difference in the circumferential direction among these circumferential grooves.

In another preferable embodiment of the invention, a height of the groove fence portion is not less than 70% but less than 100% of a depth of the circumferential groove.

BRIEF DESCRIPTION OF THE DRAWINGS

The invention will be described with reference to the accompanying drawings, wherein:

FIG. 1a is a sectional view of a first embodiment of the groove fence according to the invention;

FIG. 1b is a plan view of the groove fence shown in FIG. 1a;

FIG. 2a is a sectional view of a second embodiment of the groove fence according to the invention;

FIG. 2b is a plan view of the groove fence shown in FIG. 2a;

FIG. 3a is a sectional view of a third embodiment of the groove fence according to the invention;

FIG. 3b is a plan view of the groove fence shown in FIG. 1a;

FIG. 4a is a sectional view of a fourth embodiment of the groove fence according to the invention;

FIG. 4b is a plan view of the groove fence shown in FIG. 4a;

FIG. 5a is a sectional view of a circumferential groove having no groove fence as a comparative example;

FIG. 5b is a plan view of the circumferential groove shown in FIG. 5a;

FIG. 6a is a sectional view of the conventional groove fence;

FIG. 6b is a plan view of the groove fence shown in FIG. 6a;

FIG. 7b is a plan view of the groove fence shown in FIG. 7a;

DESCRIPTION OF PREFERRED EMBODIMENTS

Figure 7A:
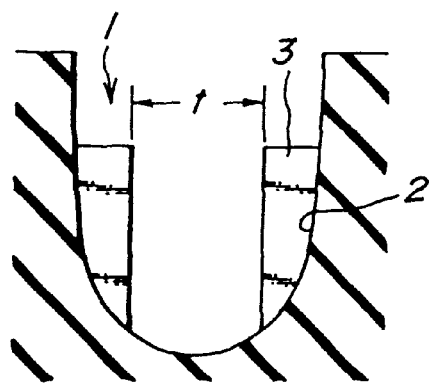
FIG. 7a is a sectional view of another conventional groove fence.

The invention will concretely be described with reference to FIGS. 1–4.

In the invention, the groove fence portion extending in a direction of blocking a circumferential groove 1 in a tread is comprised of at least two protrusions 3 extending from a groove wall 2 of a groove bottom of the circumferential groove. A space t between the protrusions under a normal internal pressure in a widthwise direction of the tire is 0.5–2.0 mm, and a space s between the protrusions under a load in the circumferential direction is 0.4–3.0 mm so as not to contact these protrusions with each other.

When the space t between the protrusions in the widthwise direction is less than 0.5 mm, a problem in drainage property occurs. When it exceeds 2.0 mm, a certain space t is existent under loading and hence the effect of reducing the columnar resonance is insufficient. Also, when the space s between the protrusions in the circumferential direction is less than 0.4 mm, if oblique input such as side force or the like is applied to the tire, the protrusion collide with each other and the occurrence of crack through deformation accompanied therewith can not be avoided. When it exceeds 3.0 mm, sound gets away from the space and hence the effect of reducing the columnar resonance is insufficient. Moreover, the thickness of the protrusion in the circumferential direction is preferable to be 1–4 mm from a viewpoint of maintaining the pass of water through the circumferential groove. That is, the groove fence portion has such a rigidity that it is not opened by air but is opened by water pressure, whereby the drainage property is ensured.

In a first embodiment of the groove fence portion shown in FIGS. 1a and 1b, the protrusions are double door type protrusions extending a part of rubber constituting opposed walls 2 of the circumferential groove 1 toward a center thereof as a land portion and having spaces t and s. For example, the groove fence portion has sizes of h=14.0 mm, d=2.0 mm, w=11.0 mm, t=1.0 mm, and s=0.6 mm.

In a second embodiment of the invention shown in FIGS. 2a and 2b, the forms of the protrusions are unsymmetrical, but the spaces t and s between the upper ends of the protrusions are within the above ranges, respectively. Thus, that the effect aimed at the invention can be obtained without colliding the protrusions with each other under loading.

In a third embodiment of the invention shown in FIGS. 3a and 3b, the protrusions are concave form and convex form, respectively so as not to collide them with each other. In this case, the space s is a total length of $s_1$ and $s_2$.

In a fourth embodiment of the invention shown in FIGS. 4a and 4b, the groove fence portion is three protrusions 3, which are a pair of protrusions extending from opposed groove walls 2 and a protrusion extending from a groove bottom between these protrusions. In this case, the space t is a total length of $t_1$ and $t_2$.

Moreover, the upper face of the protrusion is not necessarily flat but may be slanting.

In the heavy duty pneumatic tire according to the invention, it is favorable that the groove fence portions are disposed in each of the circumferential grooves at such an interval in the circumferential direction that only one of the groove fence portions is always and substantially included in the circumferential groove at a ground contact region defined in the running of the tire. Thus, plural groove fence portions are not included in the ground contact region during the running every the circumferential groove. Therefore the occurrence of pumping sound when air compressed in the groove is forced out from the groove can be avoided.

Additionally, it is favorable that the groove fence portions are arranged at a given pitch difference in the circumferential direction among the circumferential grooves. In this case, the noise peak between the mutual circumferential grooves is dispersed and hence a frequency band of noise can be shifted. Further, when the groove fence portions are arranged so as to come close to each other in the circumferential direction, the effect of controlling the higher propagation of air vibration in the groove can be obtained. Moreover, since the plural groove fence portions are not included in the ground contact region, the pass of water through the groove is not substantially obstructed during running on a wet road surface.

Furthermore, the height of the groove fence portion is favorable to be not less than 70% but less than 100% of a depth of the circumferential groove. Columnar resonance is generated when a high frequency vibration of the groove wall of the circumferential groove (or land portion wall) is transmitted to air in the circumferential groove during the running of the tire. Therefore, when the height of the groove fence portion is 100% of the depth of the circumferential groove, the vibration of the circumferential groove wall (or land portion wall) is transmitted to the groove fence portion to vibrate air in the circumferential groove and hence the sufficient effect of suppressing noise can not be obtained. Also, it is difficult to sufficiently ensure the pass of water through the circumferential groove and hence there is caused a fear of damaging the wet skid resistance. When the height of the groove fence portion is less than 70% of the depth of the circumferential groove, the effect of preventing the occurrence of noise through the columnar resonance can not be sufficiently obtained.

The following examples are given in illustration of the invention and are not intended as limitations thereof.

EXAMPLES 1–4

There are prepared radial tires having a tire size of 245/70R19.5, in which groove fence portions shown in FIGS. 1–4 and satisfying conditions shown in Table 1 are disposed in each of four straight circumferential grooves at such an interval in the circumferential direction that only one of the groove fence portions is always and substantially included in the circumferential groove at a ground contact region defined in the running of the tire and at a given pitch difference in the circumferential direction among these circumferential grooves. Then, a noise test is carried out after the each of the tires is mounted onto a vehicle. Also, a state of damaging the groove fence portion is examined after the running on a drum over a distance of 100,000 km.

COMPARATIVE EXAMPLE 1

A tire is prepared in the same manner as in Example 1 except that the groove fence portion is not formed as shown in FIG. 5, and then subjected to the same noise test as mentioned above.

COMPARATIVE EXAMPLE 2

Figure 9:
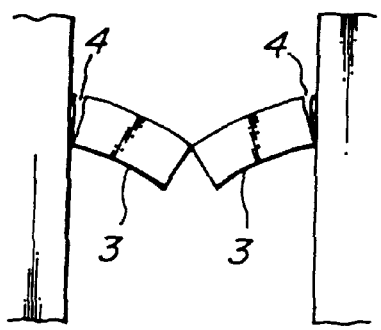
FIG. 9 is a plan view illustrating a behavior of the conventional groove fence shown in FIG. 6 under loading.

A tie is prepared in the same manner as in Example 1 except that the two protrusions extend from opposed groove walls of the circumferential groove in form of double doors as a groove fence portion as shown in FIG. 6 and collide with each other during loading as shown in FIG. 9, and then subjected to the same noise test as mentioned above.

COMPARATIVE EXAMPLE 3

Figure 7B:
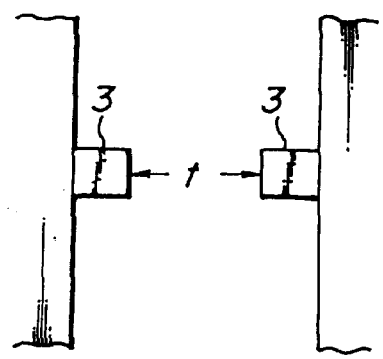

A tire is prepared in the same manner as in Example 1 except that the two protrusions extend from opposed groove walls of the circumferential groove in form of double doors and a space exists therebetween under loading as a groove fence portion as shown in FIG. 7. It is then subjected to the same noise test as mentioned above.

The thus obtained test results are also shown in Table 1.

formed in a circumferential groove so as to extend in a direction blocking the circumferential groove, in which the groove fence portion comprises at least two protrusions extending from a groove wall and/or groove bottom of the circumferential groove, and a space between the protrusions under a normal internal pressure in a widthwise direction of the tire is 0.5–2.0 mm, and a space between the protrusions under a load in the circumferential direction is 0.4–3.0 mm so as not to contact these protrusions with each other.

2. A heavy duty pneumatic tire according to claim 1, wherein the groove fence portions are disposed in each of the circumferential grooves at such an interval in the circumferential direction that only one of the groove fence portions is always and substantially included in the circumferential groove at a ground contact region defined in the running of the tire and the groove fence portions are arranged at a given pitch difference in the circumferential direction among these circumferential grooves.

3. A heavy duty pneumatic tire according to claim 1, wherein a height of the groove fence portion is not less than 70% but less than 100% of a depth of the circumferential groove.

4. A heavy duty pneumatic tire according to claim 1, wherein said two protrusions are unsymmetrical with respect to a radial centerline of said circumferential groove.

5. A heavy duty pneumatic tire according to claim 1, wherein one of said two protrusions extends from said groove wall in a concave shape and the other of said two protrusions extends from an opposite groove wall in a convex shape.

6. A heavy duty pneumatic tire according to claim 1, wherein said groove fence portion comprises first and second protrusions extending from opposite groove walls and a third protrusion extending upward from said groove bottom and wherein said third protrusion is circumferentially spaced from said first and second protrusions.

TABLE 1

|  | Example 1 | Example 2 | Example 3 | Example 4 | Comparative Example 1 | Comparative Example 2 | Comparative Example 3 |
| --- | --- | --- | --- | --- | --- | --- | --- |
| Corresponding figure | FIG. 1 | FIG. 2 | FIG. 3 | FIG. 4 | FIG. 5 | FIG. 6 | FIG. 7 |
| Space s | 0.6 | 0.4 | 0.4/0.4 | 1.0 | — | — | — |
| Space t between protrusions (mm) |  |  |  |  |  |  |  |
| under internal pressure | 1.0 | 1.2 | 1.6 | 0.7/0.7 | — | 1.0 | 2.5 |
| under loading | −0.7* | −0.5 | −0.8 | −0.2/−0.2 | — | 0 | 0.9 |
| Groove height h (mm) | 14.0 | 13.8 | 14.0 | 13.5 | 14.0 | 14.0 | 14.0 |
| Depth d up to upper end of protrusion (mm) | 2.0 | 1.8 | 2.5 | 2.0 | — | 2.0 | 2.0 |
| Groove width w (mm) | 11.0 | 10.5 | 13.0 | 11.0 | 11.0 | 11.0 | 11.0 |
| Noise level (dB) | −1.0 | −1.0 | −0.8 | −0.7 | standard | −1.0 | −0.3 |
| Running test result | no crack | no crack | no crack | no crack | — | chipping of groove fence | no crack |

Figure 8:
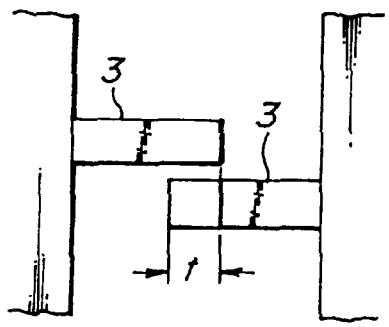
FIG. 8 is a plan view illustrating a behavior of the groove fence according to the invention under loading.

*distance t in FIG. 8 is represented by addition of minus.

As mentioned above, the effect of reducing noise during the running of the tire can be maintained over a long time of period in the heavy duty pneumatic tire according to the invention.

What is claimed is:

1. A heavy duty pneumatic tire comprising; a tread provided with plural circumferential grooves extending in a circumferential direction of the tire, land portions defined by these circumferential grooves, and a groove fence portion 7. A heavy duty pneumatic tire according to claim 1, wherein upper faces of said protrusions facing toward the tread surface are slanted.

8. A heavy duty pneumatic tire according to claim 1, wherein said protrusions have a thickness in the circumferential direction of said tire in a range of 1.0–4.0 mm.

* * * * *